(12) United States Patent
Podhrázký

(10) Patent No.: US 11,166,345 B2
(45) Date of Patent: Nov. 2, 2021

(54) CONTRACTION DEVICE HAVING HEATING CONTROL

(71) Applicant: Haimer GmbH, Hollenbach-Igenhausen (DE)

(72) Inventor: Antonín Podhrázký, Jemnice (CZ)

(73) Assignee: HAIMER GMBH, Hollenbach- (DE)

( * ) Notice: Subject to any disclaimer, the term of this patent is extended or adjusted under 35 U.S.C. 154(b) by 189 days.

(21) Appl. No.: 16/066,780

(22) PCT Filed: Dec. 21, 2016

(86) PCT No.: PCT/EP2016/082255
§ 371 (c)(1),
(2) Date: Jun. 28, 2018

(87) PCT Pub. No.: WO2017/114728
PCT Pub. Date: Jul. 6, 2017

(65) Prior Publication Data
US 2019/0014620 A1    Jan. 10, 2019

(30) Foreign Application Priority Data

Dec. 28, 2015   (DE) .......................... 102015016831.2

(51) Int. Cl.
*H05B 6/06* (2006.01)
*B23P 11/02* (2006.01)
*H05B 6/10* (2006.01)
*H05B 6/38* (2006.01)
(Continued)

(52) U.S. Cl.
CPC .............. *H05B 6/06* (2013.01); *B23P 11/027* (2013.01); *H05B 6/101* (2013.01); *H05B 6/14* (2013.01); *H05B 6/38* (2013.01); *H05B 6/40* (2013.01)

(58) Field of Classification Search
CPC ...... B23P 11/027; F16L 55/172; F16L 55/175
See application file for complete search history.

(56) References Cited

U.S. PATENT DOCUMENTS

| 4,017,701 | A | 4/1977 | Mittelmann |
| 2004/0160020 | A1* | 8/2004 | Irion ...................... B23B 31/02 |
| | | | 279/102 |

(Continued)

FOREIGN PATENT DOCUMENTS

| CN | 101829923 A | 9/2010 |
| DE | 19915412 A1 | 10/2000 |

(Continued)

OTHER PUBLICATIONS

International Search Report dated Jul. 6, 2017 in parent International application PCT/EP2016/082255.

(Continued)

*Primary Examiner* — Justin C Dodson
*Assistant Examiner* — Dilnessa B Belay
(74) *Attorney, Agent, or Firm* — Polson Intellectual Property Law, PC; Margaret Polson; Christopher Sylvain

(57) ABSTRACT

The invention relates to a method for monitoring the temperature of the sleeve part of a tool holder, which sleeve part is inserted into the induction coil of a contraction device, wherein the instantaneous inductance of the induction coil is measured during the inductive heating and the current supply to the induction coil is influenced if the instantaneous inductance approaches, reaches, or exceeds a specified value.

19 Claims, 8 Drawing Sheets

(51) Int. Cl.
*H05B 6/40* (2006.01)
*H05B 6/14* (2006.01)

(56) References Cited

U.S. PATENT DOCUMENTS

| | | | | |
|---|---|---|---|---|
| 2008/0219034 | A1* | 9/2008 | Haimer | H05B 6/06 363/37 |
| 2012/0097663 | A1* | 4/2012 | Ito | H05B 6/06 219/602 |
| 2016/0169751 | A1* | 6/2016 | Zenzen | G05D 23/2401 374/184 |

FOREIGN PATENT DOCUMENTS

| | | |
|---|---|---|
| DE | 10102710 A1 | 9/2002 |
| DE | 102005014984 A1 | 10/2006 |
| DE | 102005042615 A1 | 3/2007 |
| DE | 102008045781 A1 | 3/2010 |
| EP | 0658068 A2 | 6/1995 |
| WO | 0189758 A1 | 11/2001 |
| WO | 2013167868 A2 | 11/2013 |
| WO | 2014180750 A2 | 11/2014 |

OTHER PUBLICATIONS

Written Opinion of the International Searching Authority dated Jul. 6, 2017 in parent International application PCT/EP2016/082255.
U.S. Appl. No. 16/066,516, filed Jun. 27, 2018. Not provided as this is available in the USPTO system.
Office Action dated Aug. 3, 2020 in related Chinese application 201680081178.0.

* cited by examiner

CONTRACTION DEVICE HAVING HEATING CONTROL

BASIC SUBJECT OF THE INVENTION

The invention relates to a shrink-fit device according to the preamble to claim 1.

PRIOR ART

Shrink-fit devices for shrink-mounting and removal of tool shafts in tool holders have been known for quite some time. Originally, such shrink-fit devices were operated with a gas burner or hot air, by means of which the sleeve part of the tool holder was heated in order to cause it to expand enough that it can accommodate or release a snugly-seated tool shaft. Recent times have seen widespread use of shrink-fit devices in which the respective tool holder is heated with the aid of an induction coil. This has significantly accelerated the shrink-fitting process, has made it more efficient and easy to use, and has therefore contributed to its widespread use.

The first shrink-fit device that was usable for practical applications is described in the patent literature by the German patent application DE 199 15 412.

The shrink-fit devices that have been disclosed up to this point are not optimally automated. Errors can occur such as an excessively long inductive heating of the sleeve part of a tool holder. This can result in an overheating of the sleeve part of the tool holder. The sleeve part is then, so to speak, unintentionally annealed. This can result in a disadvantageous change in structure. It may be necessary to discard the sleeve part and thus the entire tool holder. If the sleeve part is not immediately discarded, there is in any case a danger that it will develop cracking if it is overheated multiple times.

Attempts have already been made to remedy this issue by measuring the temperature of the sleeve part with an infrared detector or with a sensor that contacts the surface of the sleeve part. The measurement with an infrared detector depends significantly on the color and quality of the sleeve part. Particularly after long use, the sleeve parts can exhibit certain annealing colors that distort the temperature measurement. The dirt and possible residues of cooling lubricants do the rest.

The contacting sensors have their own problems as well. This is because the precision of the temperature measurement depends among other things on the contact intensity and also on how clean the surface of the sleeve part is.

Object of the Invention Will Be

The object of the invention, therefore, is to create a shrink-fit device and shrink-fitting method that is able to limit the thermal load of the sleeve part and in the ideal case, to limit it to that which is necessary.

Attainment According to the Invention in Claim 1

According to the invention, a method for monitoring the temperature of the sleeve part of a tool holder that is accommodated in the induction coil of a shrink-fit device is proposed, which is characterized by the following features: the present inductance of the induction coil is measured during the inductive heating and is used as a measure for the heating. The power supply to the induction coil is influenced when the present inductance approaches, reaches, or exceeds a predetermined value. As a rule, the power supply is then switched off.

The use of the present inductance as a measure for the current temperature of the sleeve part has the significant advantage that the interference variables such as color, quality, and cleanliness of the surface of the sleeve part, which had previously distorted measurements, are completely suppressed. In comparison to previously used electrical values such as the measurement or calculation of the electrical energy that has been applied up to a certain point in time, the measurement of the present inductance has the advantage that it is significantly more precise. Consequently, the shrink-fit chuck is not always heated to the maximum value and for a maximum time, but instead, power is induced in a customized way, which prevents damage to the shrink-fit chuck and may accelerate the re-cooling.

Other Embodiment Options

Another object of the invention is to disclose a shrink-fit device that is significantly more compact than the previously known shrink-fit devices and that therefore constitutes a suitable point of departure for designing a shrink-fit device for mobile use—ideally so that the shrink-fit device is an appliance that can be transported like a small suitcase, permitting the user to employ it for novel applications by simply bringing it to a machine tool that is to undergo a tool change and using it there so as to be able to perform a tool change on-site at the machine.

This naturally does not exclude the possibility that the shrink-fit device can also be used in a conventional way in stationary fashion on a corresponding mounting device, but the mobile use is preferable.

This object is attained by means of a shrink-fit device for shrink-mounting and removal of tools equipped with a tool shaft as described in connection with the main claim.

The shrink-fit device includes a tool socket, which has a sleeve part that is open at its free end and is composed of an electrically conductive material for accommodating the tool shaft in a frictionally engaging fashion. The shrink-fit device also has an induction coil embodied as an annular or cylindrical coil that encompasses the sleeve part of the tool socket and is acted on by an alternating current, which preferably has a high frequency (and ideally, a frequency of greater than 1 kHz), in order to heat the sleeve part. In this case, the induction coil has a first casing composed of magnetically conductive and electrically nonconductive material on its outer circumference, for example made of ferrite or of a powdered metal material. Electrically nonconductive material as defined by the invention does not necessarily have to be an insulator. A material is considered to be nonconductive if the eddy currents induced by magnetic fields only cause a slight warming or no warming in the material. Another component of the shrink-fit device according to the invention is power semiconductor components for producing an alternating current that powers the induction coil. Typically, so-called IGBTs are used for this purpose. But thyristors or MOSFETs can also be used. The shrink-fit device according to the invention also includes an induction coil housing that is generally composed of plastic. Such an induction coil housing typically provides no magnetic shielding effect or at least none that is perceptible. Its sole purpose is to protect the components contained in it from external influences and if possible, to simultaneously prevent the operator from coming into contact with voltage-carrying parts. The shrink-fit device according to the invention features the fact that the induction coil and its first casing are enclosed on the outer circumference by a second casing. This second casing is composed of magnetically nonconductive and electrically conductive material. It is designed so that a possibly present leakage field induces electrical current in it, thus drawing energy from the leakage field and thereby weakening the field. This means that it completely eliminates or at least reduces the leakage field situated in its vicinity to such an extent that—without further measures or instead in connection with broader flanking measures—the remainder of the leakage field that is still present in its immediate vicinity is so weak that it does not exert any negative influence on power semiconductor components situated there.

This attainment according to the invention also features the fact that at least the power semiconductor components are accommodated together with the induction coil in an induction coil housing. The induction coil housing is preferably composed of an insulating material or is covered with such a material on the outside. It includes, accommodated either on its circumference side or on its interior, the following components: the induction coil, the first and second casing of the induction coil, and at least the power semiconductor components, and preferably also the capacitors that are positioned directly in the power circuit and/or the control unit.

The term "encompassing" is understood to mean enclosing at least along the circumference of the induction coil. You as a rule, the induction coil housing will also extend into the region of the upper and lower face and will completely or partially cover this face. It therefore has a cup-shaped design. As a rule, the induction coil housing has no wall openings, at least at its circumference—aside from possibly a local opening due to the function, i.e. for the supply cable and the like.

Other Embodiment Options

Preferably, the shrink-fit device is embodied so that its power semiconductor components are accommodated directly on the outer circumference of the second casing. The expression "directly on the outer circumference" can mean with a maximum radial distance from the outer circumference surface of the second casing of the induction coil of up to approximately 60 mm or better yet, only up to 15 mm. If a second casing is not provided, then the outer circumference surface of the first casing is decisive. Ideally, however, the top surfaces of the power semiconductor components are in direct, thermally conductive contact with the second casing, possibly with the provision of an adhesive layer. The second casing is preferably one that is embodied so that it forms a cooling body for the power semiconductor components. The second casing then absorbs the heat loss generated in the power semiconductor components and carries it away.

It has turned out to be particularly advantageous if the second casing has one or preferably a plurality of recesses that can each accommodate a respective power semiconductor component, preferably so that the semiconductor component is enclosed on at least 3 sides or better still 4 sides by the second casing. Such a recess in the second casing forms a region that enjoys particular protection from the remainder of any magnetic leakage field that is still present. This is because the leakage field lines cannot penetrate into this deeper-lying recess in which the power semiconductor component is positioned. They are instead captured by the surrounding regions of the second casing that are higher or are situated radially further to the outside.

It has turned out to be particularly advantageous if the shrink-fit device, which includes at least one rectifier or at least one smoothing capacitor as well as resonant circuit capacitors, which are involved in producing a high-frequency alternating current inside the device for powering the induction coil, has an induction coil around whose outer circumference the capacitors are grouped—generally so that if they are conceptually rotated around the center of the coil, the capacitors form a cylindrical ring, which encompasses the induction coil. Here, too, the capacitors should be positioned directly on the outer circumference of the second casing of the induction coil. In this connection, the expression "directly on the outer circumference" can be understood to mean a maximum radial distance of up to 125 mm, preferably of up to 40 mm, measured from the outer circumference of the second casing of the induction coil. If a second casing is not provided, then the outer circumference surface of the first casing is decisive.

A particularly advantageous embodiment of the shrink-fit device, for which not only dependent protection, but also independent protection that is not dependent on the preceding claims is claimed, is composed of at least one induction coil for shrink-mounting and removal of tool shafts in tool holders, which coil is encompassed by a first casing, composed of magnetically conductive and electrically nonconductive material on its outer circumference, for example made of ferrite or of a powdered metal material; the induction coil and its first casing are encompassed by a second casing, which is composed of magnetically nonconductive and electrically conductive material. That which has been stated above also applies to the second casing. Ideally, however, this second casing is designed so that under the influence of a leakage field of the induction coil that penetrates it, eddy currents are generated, which on the outer surface of the second casing, lead to an elimination of the leakage field influence. In this case, it is potentially possible to make use of the principle of so-called mutual inductance. In the second casing, the leakage field that penetrates it generates eddy currents, which in turn generate an opposing field, which eliminates the interfering leakage field, at least to the extent that power semiconductor components can be accommodated in the vicinity of the second casing without suffering permanent damage.

Another particularly preferred embodiment of the shrink-fit device, for which not only dependent protection, but also independent protection that is not dependent on the preceding claims is claimed, is composed of an induction coil for shrink-mounting and removal of tools in tool holders, which is accommodated—along with the power semiconductor components that are associated with it and are necessary for producing the alternating current, which is modified relative to the grid current and powers the induction coil—in the induction coil housing that encompasses it. Preferably, other components such as capacitors positioned in power circuits and/or a rectifier and/or a transformer and/or the electronic control unit are also accommodated inside the induction coil housing. In this embodiment, a second casing is not provided. If need be, it can be substituted for by the fact that the power semiconductor components and/or the control electronics and/or the rectifiers each have a respective shielded housing or are accommodated in shielded compartments. In this case, the power semiconductor components are preferably actively cooled, for example with the aid of a coolant supply of the machine tool. This approach is possible with a higher degree of complexity and is therefore included in the claims scope.

This yields a particularly compact shrink-fit device, which is no longer dependent on a separate, more or less large switch cabinet positioned next to the shrink-fit device in which these components are separately accommodated. This brings one a good deal closer to the goal of a mobile shrink-fit device.

Preferably, all of the variants of the shrink-fit device according to the invention are designed so that the end surface of the induction coil oriented away from the tool socket is provided with a covering made of a magnetically conductive and electrically nonconductive material.

Ideally, the cover is embodied in the form of a poll shoe of the kind that covers the entire area of the end surface of the induction coil. This is particularly important in the present context in order to keep the outer area free of a damaging leakage field. In exceptional cases, the covering covers the entire area of the end surface of the induction coil if not physically, then magnetically.

It has turned out to be particularly advantageous if the cover has a localized shielding collar in the center, close to the sleeve part, that protrudes in the direction of the longitudinal axis L preferably by at least twice the amount of the tool diameter across the free end surface of the sleeve part of the tool holder. A shielding collar of this kind prevents the tool shaft that is close to the sleeve part from being exposed to a damaging leakage field or being the starting point for such a leakage field, which extends from there out into the surroundings and exerts the damaging influence, which is to be avoided, on the power semiconductor components positioned in the immediate vicinity of the induction coil.

It is advantageous if the end surface of the induction coil oriented toward the tool socket is also overlapped by a magnetically conductive and electrically nonconductive material and is preferably covered across its entire area except for the receiving opening for the tool holder.

In a particularly preferred embodiment, the shrink-fit device has at least one circuit board that is positioned directly on the outer circumference of the induction coil or that predominantly or completely encloses the outer circumference of the induction coil, preferably in the form of a ring that is predominantly or fully self-contained in the circumference direction and electrically contacts the capacitors and/or the power semiconductor components positioned in the power circuit. In this case, the circuit board is preferably understood to be a board approximately 0.75 mm thick that is provided with conductor paths made of a metallic material, but alternatively, a film equipped with metallic conductor paths can also be used. It is particularly advantageous if the circuit board is an annular circuit board whose rotational symmetry axis preferably extends coaxially, or otherwise parallel to the longitudinal axis of the induction coil.

Ideally, two annular circuit boards are provided, between which capacitors that are positioned in the power circuit are arranged along the circumference of the induction coil.

In a particularly preferred exemplary embodiment, the second casing forms one or more cooling ducts that preferably extend on its inside, considering the second casing as a whole. For this purpose, the second casing can be embodied so that it is composed of two or more parts. The individual parts of the casing are then sealed relative to one another. This significantly facilitates the production of internal cooling ducts.

Another particularly advantageous embodiment of the shrink-fit device, for which not only dependent protection, but also independent protection that is not dependent on the preceding claims is claimed, is a shrink-fit device, which features the fact that the shrink-fit device has a coupling for fastening the shrink-fit device to the recess of a machine tool spindle. This embodiment as well brings one significantly closer to the goal of being able to achieve a practicably usable mobile shrink-fit device. This is because it is dangerous to work with a mobile shrink-fit device that is nearly resting freely somewhere in the vicinity of the machine tool, without somehow being reliably fastened. This problem is eliminated with the coupling according to the invention. The coupling makes it possible, after the removal of the shrink-fit chuck that is to undergo a tool change, to fasten the shrink-fit device in its place on the machine spindle. In this case, the shrink-fit device is securely held for the duration of its operation and can then be quickly decoupled and removed.

In one variant, the coupling can also be used for storing the shrink-fit device in the tool magazine of the machine tool. From the magazine, it can be automatically inserted into the machine spindle by the tool changer.

In another variant, the tool changer can take the shrink-fit device from the tool magazine, but not insert it into the machine spindle, instead conveying it directly to a shrink-fit socket that is clamped in the machine spindle and can shrink-mount or remove the tool. Here, too, the separate coupling that is provided for the shrink-fit device is particularly advantageous.

Ideally, the shrink-fit device should also be designed so that when it has an internal cooling, it can be supplied with coolant by the cooling inductive heating of the machine tool. It is particularly advantageous to embody the shrink-fit device so that the induction coil is accommodated with its first and, if provided, second casing and at least with the power semiconductor components and/or the capacitors and/or ideally also the electronics for controlling the power semiconductor components on the inside of a coil housing or coil housing ring, which encompasses the circumference of the induction coil and preferably, also at least partially overlaps one or better two end surfaces of the induction coil. This yields a compact unit, which possibly accommodates all of the components that are necessary for operation and that are protected by the shared housing from external influences and reliably prevent the operator from coming into contact with voltage-carrying parts.

Ideally, the coil housing is provided with a plug, typically a Schuko plug (preferably in the form of a plug that is fastened to the end of the flexible cord) to provide a direct supply of single-phase grid alternating current from the public electrical system (preferably 110 V or 230 V). This makes it possible to operate the shrink-fit device virtually anywhere. All that is needed is a standard electrical outlet for electrical appliances and if need be, a conventional extension cord. Naturally, the invention is not necessarily limited to this particular preferred type of power supply. The power supply can also be 3-phase and be supplied with other voltages, depending on what power is needed in the individual case and what power supply is available at the respective location. Naturally, other voltages are possible, particularly in countries that use a different grid voltage in the public electric system.

Alternatively, it has turned out to be particularly advantageous to provide the shrink-fit device with a battery, which supplied with power. Such a device can also be highly mobile. The logical choice in this case is to provide a carriage, for example in the form of a very easily maneuverable hand truck, which carries the battery in the lower region, for example a vehicle battery, and carries the shrink-fit device in its upper region.

Furthermore, protection is also claimed for a shrink-fit inductive heating that is composed of a shrink-fit device of the type according to the invention and that features the fact that the shrink-fit inductive heating also has different coupling that can be fastened to the shrink-fit device, by means of which the shrink-fit device can be fastened to the spindle of a machine tool. This makes it possible to fasten the shrink-fit device to differently equipped machine tool spindles so that it no longer matters whether the machine tool spindle is equipped for heat shrinking an HSK coupling or a machine taper coupling, for example.

Other embodiment options, operating methods, and advantages can be inferred from the description of exemplary embodiments below with the aid of the drawings.

Between the first and second casing, preferably an intermediate casing is provided. This preferably serves as a coolant-conveying element in order to protect the second casing and the semiconductor elements mounted thereon from overheating. By contrast with the second casing, it is preferably not split in this case in order to ensure a simple coolant supply. For this reason, the intermediate casing is either electrically (but not thermally) insulated relative to the second casing or is composed of electrically non-conductive material from the outset. It goes without saying that the coolant supply is sealed relative to the other components of the shrink-fit device. Alternative concepts for the cooling of the second casing without a specially embodied intermediate ring are also conceivable. Naturally, this intermediate casing can also be embodied so that it serves as an (additional) shield.

LIST OF FIGURES

EXEMPLARY EMBODIMENTS

Figure 1:
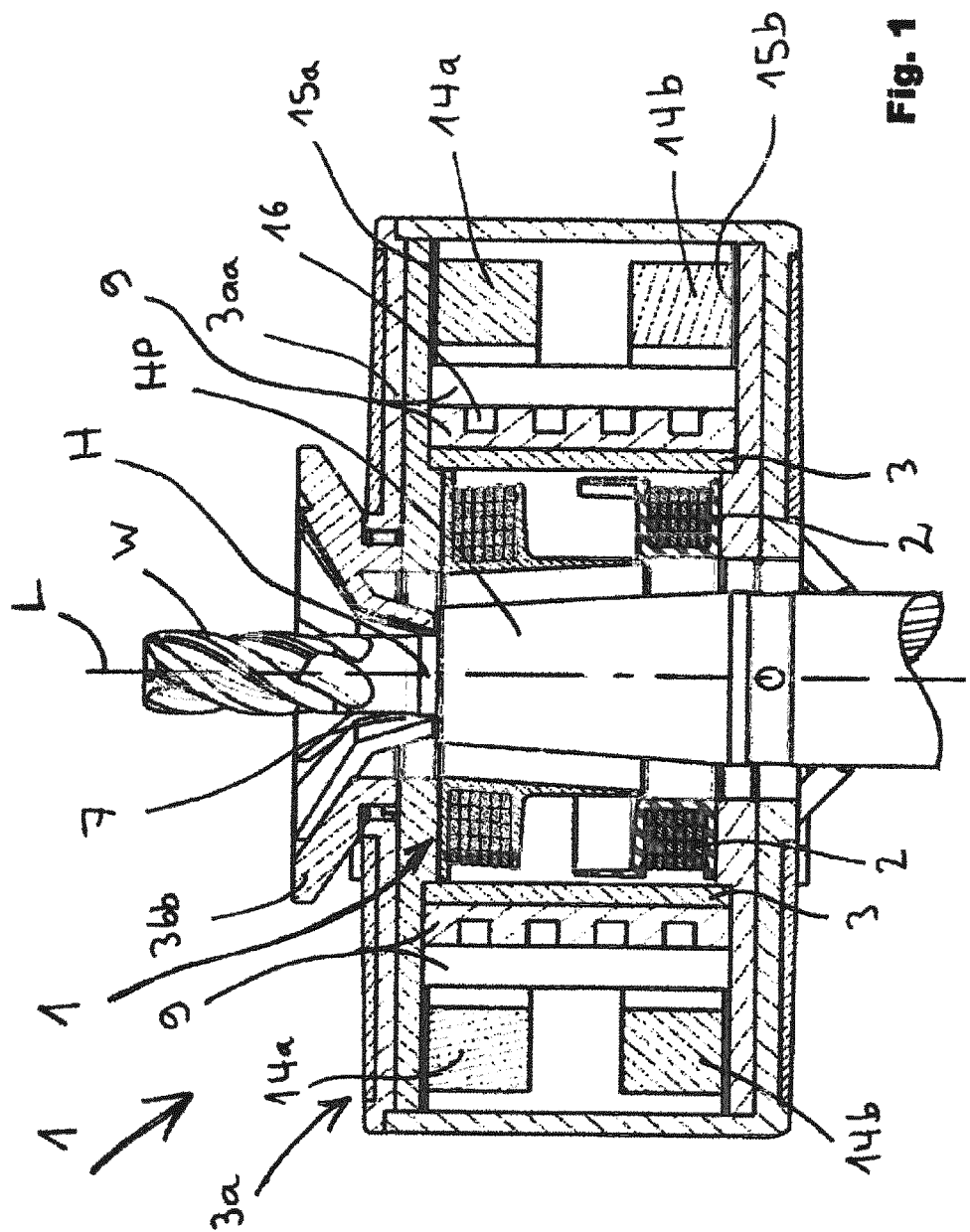
FIG. 1 shows a first exemplary embodiment in a central longitudinal section.

FIG. 1 shows a first basic overview of the device according to the invention.

Basic Principle of Inductive Shrink-Mounting and Removal

The drawing here clearly shows the induction coil 1 with its internal windings 2 into the center of which a tool holder 4 is slid in order to shrink-mount or remove the holding shaft H of a tool W in the sleeve part HP. The basic function on which the shrink-mounting and removal are based is described in greater detail in the German patent application DE 199 15 412 A1. The content thereof is hereby made the subject of this application.

The Shielding of the Induction Coil with Magnetically Conductive and Electrically Nonconductive Means The present invention places high demands on the shielding of the induction coil, even on the conventional shielding, which, by its very nature, is already known.

On its outer circumference, the induction coil is provided with a first casing 3 composed of electrically nonconductive and magnetically conductive material. Typically, the first casing 3 is composed either of ferrite or powdered metal or sintered metal material whose individual particles are separated from one another in an electrically insulating manner and which in this way, are magnetically conductive and electrically nonconductive. In order to prevent patent law-motivated circumvention attempts, it should be pointed out that in exceptional cases, it is also conceivable instead to use a laminated casing of coated transformer plates, which are separated from one another by insulating layers. In the overwhelming number of cases, such a laminated casing, however, does not fulfill the desired purpose.

It is particularly preferable for the first casing 3 to be embodied so that it is completely self-contained, i.e. covers the circumference surface of the coil completely so that even in theory, no "magnetic gaps" remain, apart from irrelevant local openings such as individual and/or small local bores or the like.

In exceptional cases, it is conceivable to embody the casing 3 so that it is composed of individual segments that cover the circumference and have certain open spaces between them—not shown in the figures. In some cases, such an embodiment is only barely able to function properly if the radial thickness of the individual segments in relation to the dimensions of the open spaces is selected to be large enough that the field coming from the inside into the respective open space is still attracted by the segments that are still in the vicinity of the open space and as a result, no leakage field of any consequence can pass the open spaces.

Preferably, the shielding composed of magnetically conductive and electrically nonconductive material does not end with just the first casing.

Instead, one or better still both end surfaces of the first casing 3 is/are adjoined by a magnetic cover 3a, 3b composed of the above-mentioned material and these covers as a rule contact the first casing 3.

On the end surface of the induction coil oriented away from the tool holder, the magnetic cover 3a is preferably embodied as a fully or preferably partially interchangeable pole shoe, i.e. as an annular structure with a central opening that forms a passage for the tool that is being shrink-mounted or removed. The term "interchangeable" preferably describes a tool-free interchangeability, which is ideally carried out with the aid of a connection that can be actuated with bare hands, for example a bayonet coupling. In this way, it is possible to process tool holders that accept different sizes of tool shaft diameter. It is nevertheless assured that the end surface of the respective sleeve part HP comes into contact with the pole shoe on the inside of the coil.

On the end surface of the induction coil oriented toward the tool holder, the magnetic cover 3b is preferably embodied as a flat washer, which ideally, completely overlaps the windings of the induction coil and has a central passage for the sleeve part.

For the invention, it is not in fact obligatory, but extremely advantageous, if the magnetic covers 3a, 3b provided on the end surface (at least locally, preferably up to at least 75%, ideally all around) protrude in the radial direction beyond the first casing 3, preferably by a radial dimension that exceeds the radial thickness of the first casing 3 by several times, in many cases by at least 4 times. The radial protrusion should preferably extend at an angle of 75° to ideally 90° relative to the longitudinal axis L. In this way, a reinforced "shielded trench," which extends in the circumference direction around the coil, is produced, whose function according to the invention will be explained in greater detail subsequently.

FIG. 1 shows a particularly preferred embodiment in which the pole shoe is composed of an annular pole piece 3aa that remains permanently in situ and that is covered on the outside with an insulating material such as plastic. The annular pole piece 3aa has a shielding collar 3ab interchangeably fastened to it. As is apparent, the annular pole piece 3aa and the shielding collar 3ab are preferably connected to each other without magnetic interruption. This is achieved in that the shielding collar contacts the annular pole piece, preferably by resting on it from above.

As is likewise shown in FIG. 1, it can be particularly advantageous if, for contacting the sleeve part, the shielding collar has a stop section AS that protrudes into the interior of the induction coil.

As is also clearly apparent from FIG. 1, in many cases, it is particularly advantageous if the shielding collar is divided into individual segments, which can be moved obliquely, with one movement component in the radial direction and one movement component in the parallel to the longitudinal axis L—so that it is possible to adjust both the free inner diameter of the shielding collar that is available as a tool passage and the depth with which the end of the shielding collar oriented toward the sleeve part protrudes into the interior of the induction coil.

In any case, the shielding collar ideally has a conical design or more precisely, has a shape that widens out in the direction of the coil longitudinal axis oriented toward the tool tip.

In order to insure the particularly high quality shielding that is desirable for the purpose according to the invention, the shielding collar protrudes beyond the free end surface of the sleeve part of the tool holder in the direction of the longitudinal axis L by at least twice and better still by at least 2.75 times the tool diameter.

The Additional Shielding with an Electrically Conductive and Magnetically Nonconductive Material Even a careful shielding by means of the first casing 3 and the magnetic covers 3a, 3b cannot prevent that a certain leakage current, which is harmful to semiconductor components, can be found at the outer circumference of the induction coil and at or in the vicinity of the circumference surface of the first casing 3. Because of this, it is not an option to place electronic components actually in this region, which react sensitively to interference voltages that are induced by the leakage field. As is particularly the case with semiconductor components, which constitute a significant part of the resonant circuit that is operated close to resonance and that is used to power the induction coil.

In order to improve the shielding even further, according to the invention, the induction coil and its first casing 3 should be enclosed at the latter's outer circumference by a second casing 9—at least when forgoing a cooling of the second casing—preferably so that the first and second casing touch each other, ideally over most or all of their circumference surfaces that face each other.

This second casing 9 is composed of magnetically nonconductive and electrically conductive material. The expression "electrically conductive" here is understood to mean not only a material that is electrically conductive on a local, so to speak "particle" level, but also a material that permits the formation of eddy currents to an extent that is relevant to the invention, see below.

The special thing about the second casing is that it is preferably embodied in such a way and preferably embodied with such a thickness in the radial direction that under the influence of the leakage field of the induction coil that penetrates it, eddy currents are produced in it, which bring about a weakening of the undesirable leakage field. In other words, this approach makes use of the principle of active shielding by means of an opposing field. It is therefore possible to reduce the leakage field at the outer surface of the second casing by more than 50%, ideally by at least 75%. The decisive factor is that in any case, the leakage field at the surface of the second casing is reduced to such an extent that semiconductor components can be sagely placed there. It is crucial for this second casing to be separated from the induction coil both in the radial direction and magnetically by the first casing since otherwise, it would heat up too quickly—which is not the case here since it does not lie in the main field, but only in the leakage field.

For the term "casing" that is used in connection with the second casing, that which was defined above in connection with the first casing applies analogously. However, the term "casing" in connection with the second casing does not mean that a section of a tube that is endless in the circumference direction has to be used. Instead, the casing is preferably divided into individual segments that are electrically insulated from one another, for example by means of joints that are filled with adhesive or plastic. This embodiment type serves to prevent a series short-circuit of the kind that would result with an endless tube section if a voltage puncture at a power semiconductor component occurs in the second casing and all of the power semiconductor components along the second casing are at the same potential. It is important, however, that the individual segments are each embodied as large enough that the leakage field can induce field-weakening eddy currents in them; as a result a full casing is not required in this individual instance; instead, it is sufficient if a conductive (with respect to the individual circumstances) grid structure is present, which has sufficiently thick dimensions.

It should be stressed at this point that a housing, which is thin-walled in the radial direction and is only provided for the sake of mechanical protection, is insufficient, even if it were to be composed of electrically conductive material. Achieving the desired effect according to the invention requires a specific embodiment of the radial wall thickness of the second casing.

The preferred material for producing the second casing 9 is aluminum.

On its interior, the second casing 9 can have cooling ducts, preferably extending in the circumference direction, optionally revolving in helical fashion, which in the latter case, ideally form a thread.

In this case, it is particularly advantageous to embody the second casing 9 of two or more parts. In this case, its first part has cooling ducts incorporated into its circumference, which are sealed by its second part.

Figure 2:
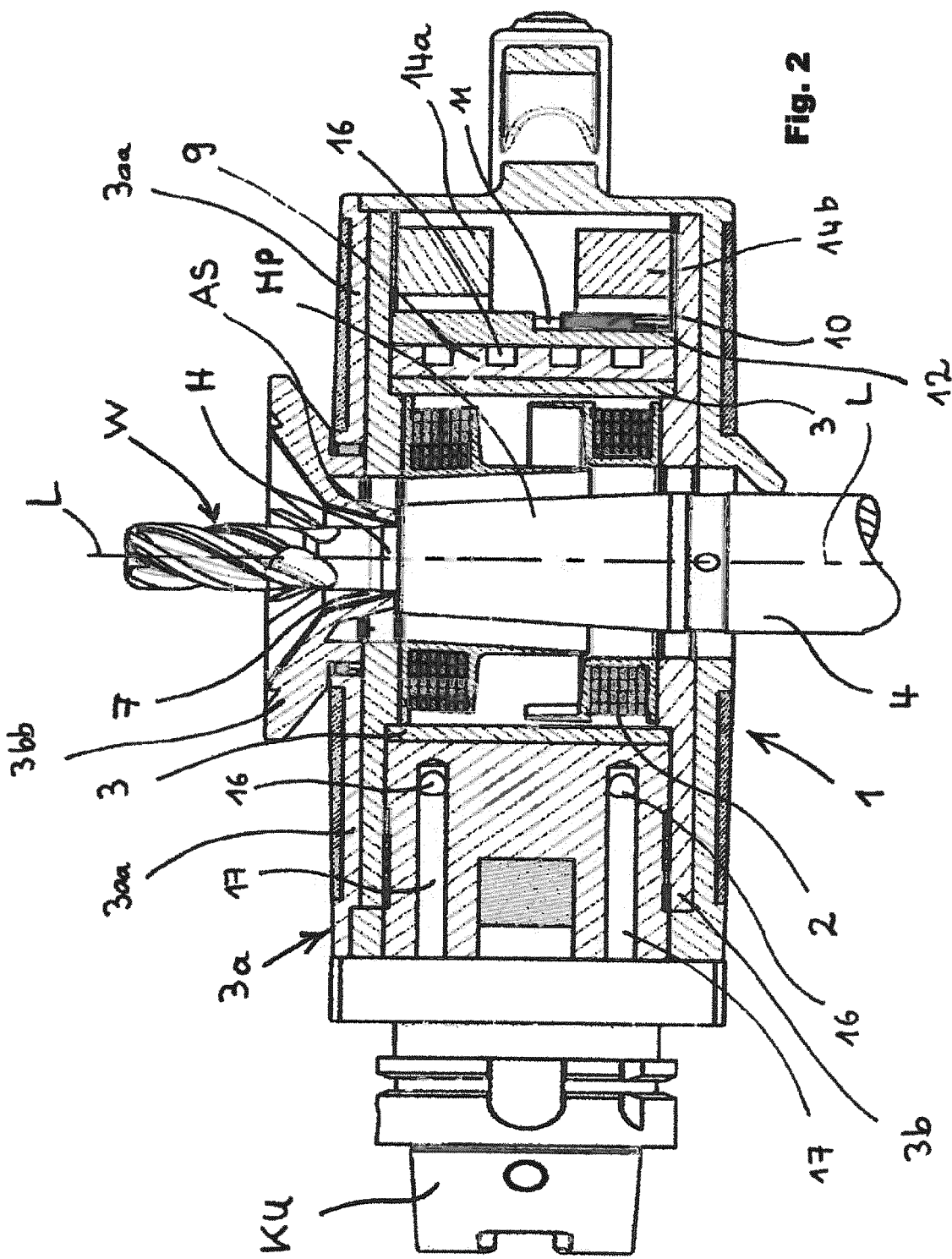
FIG. 2 shows the first exemplary embodiment in a central longitudinal section, which is rotated by 90° around the longitudinal axis L in comparison to FIG. 1.
Figure 4:
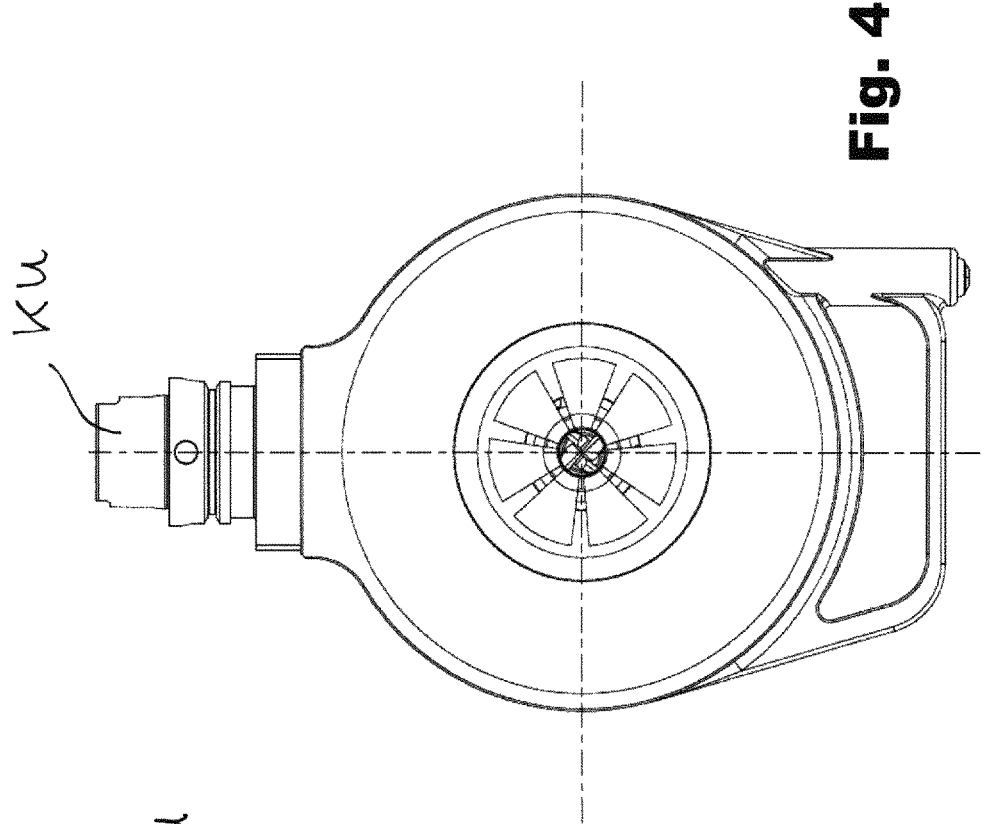
FIG. 4 shows the first exemplary embodiment in a front view from above, with the shielding collar installed.
Figure 3:
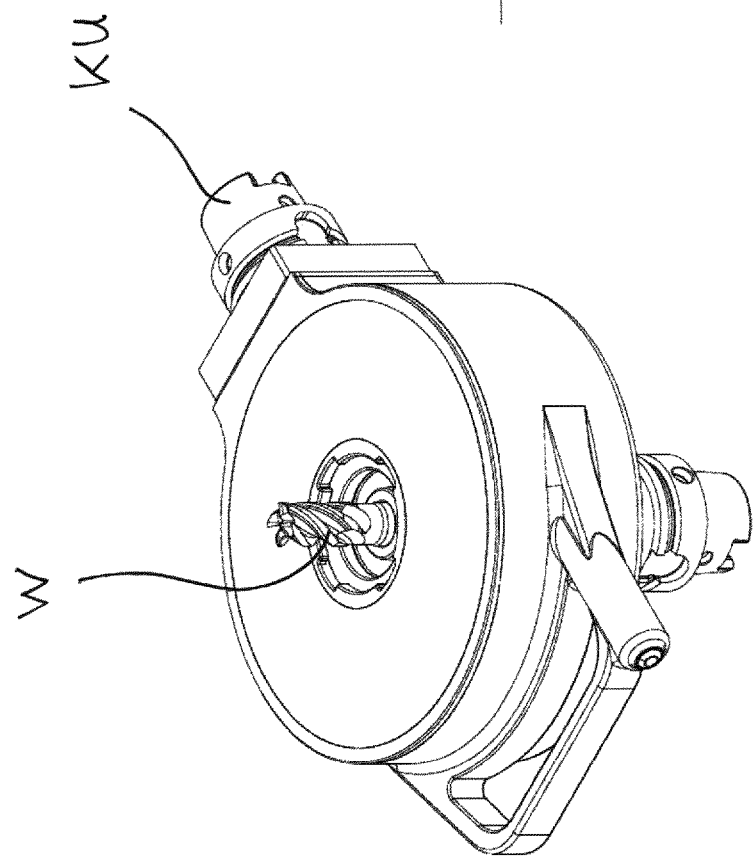
FIG. 3 shows the first exemplary embodiment in a perspective view obliquely from above, with the shielding collar removed.

At this point, reference should already be made to the left part of FIG. 2. This part of the figure shows the coolant supply lines coolant supply lines 17, which supply the fresh coolant at the beginning of the coolant duct(s) 16 and carry away used coolant.

The Particular Positioning of the Power Semiconductor Components, Capacitors, and Possibly the Electronic Control Unit As is clearly shown in FIG. 2 and FIG. 5, the second casing is surrounded at its circumference by the power semiconductor components 10, which will be explained in greater detail below and which are positioned directly at the outer circumference of the second casing.

In the present case, the power semiconductor components have two large main surfaces and four small side surfaces. The large main surfaces are preferably more than four times larger than each of the individual side surfaces. The power semiconductor components 10 are positioned so that a one of their large main surfaces is in a thermally conductive contact with the second casing 9, as a rule at its outer circumference. Ideally, the appropriately large main surface of the power semiconductor component 10 is glued with the aid of a thermally conductive adhesive to the circumference surface of the second casing 9. In this case, therefore, the second casing 9 has a double function. It not only improves the shielding and thus makes it possible to position power semiconductor components in its radial vicinity (less than 10 cm away from its circumference surface), it also optionally functions simultaneously as a cooling body for the power semiconductor components.

Figure 5:
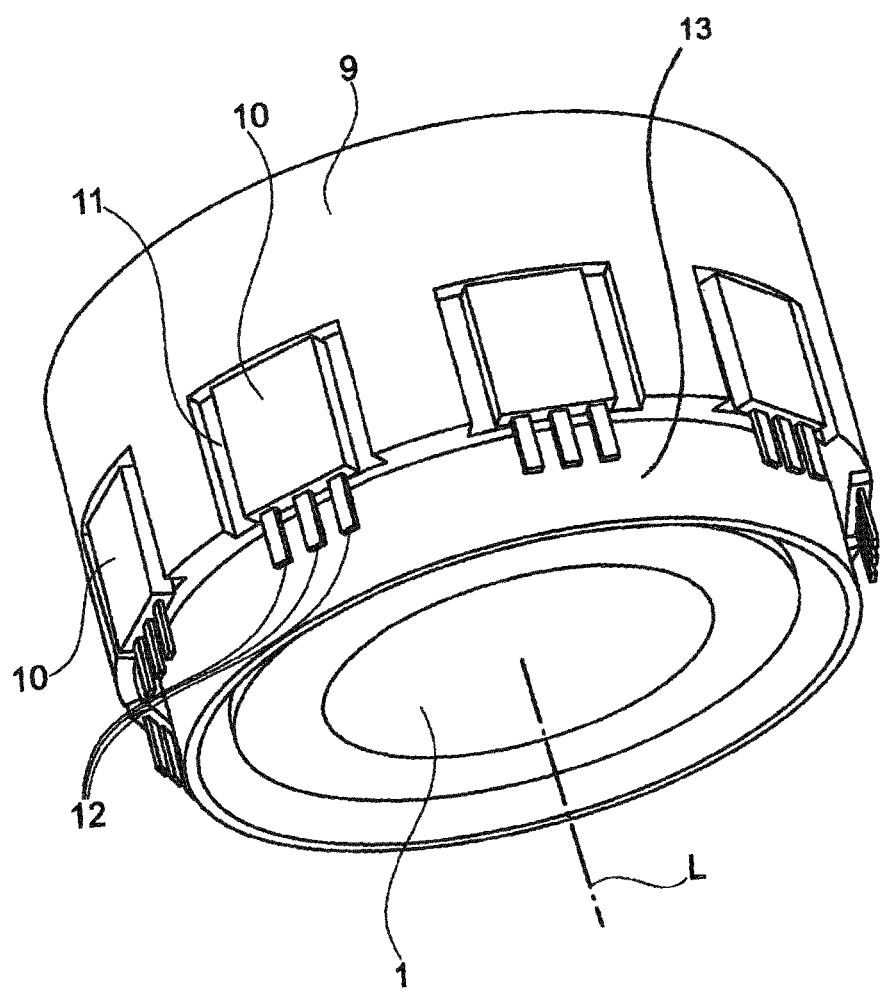
FIG. 5 shows the second casing of the first exemplary embodiment, equipped with power semiconductor components.
Figure 6:
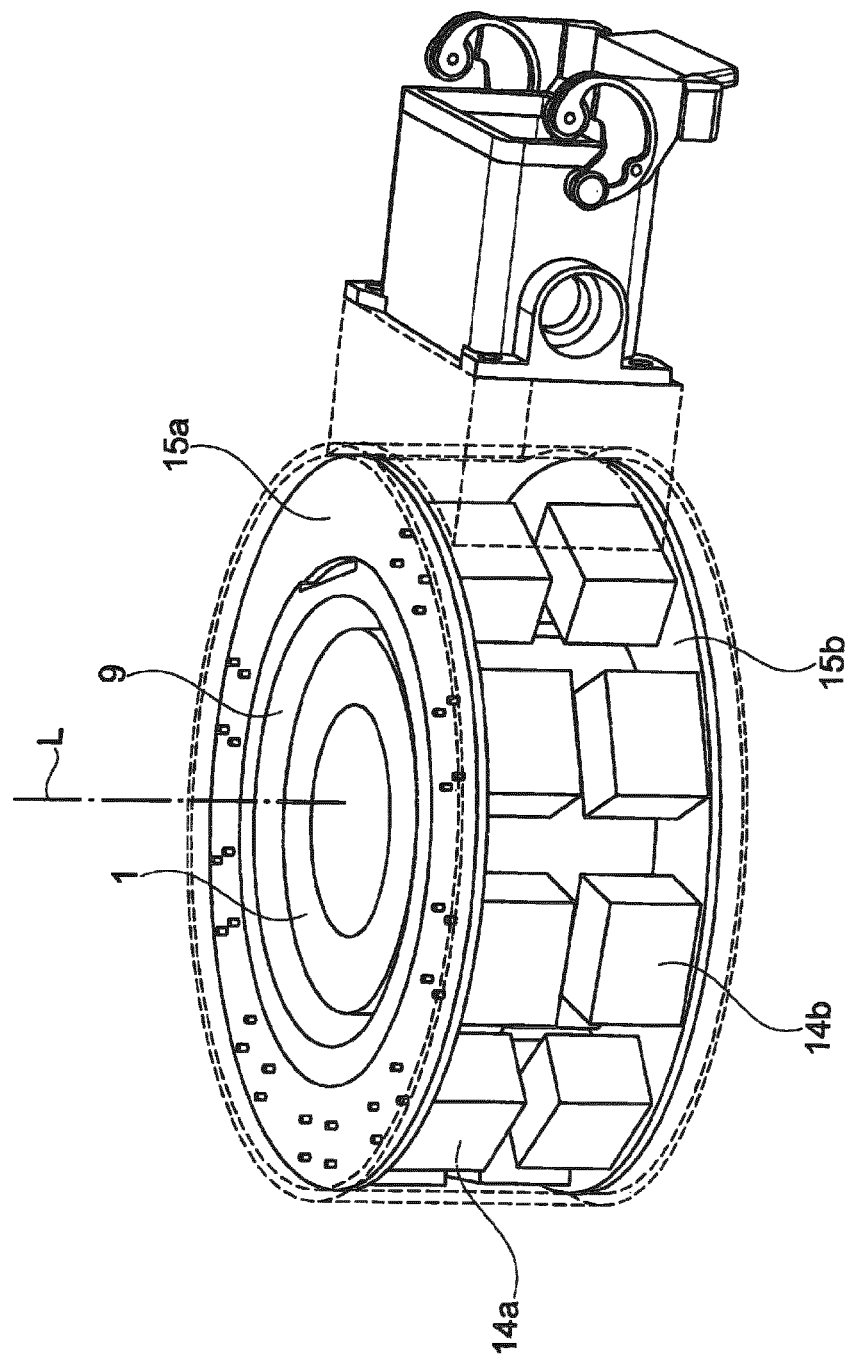
FIG. 6 shows the second exemplary embodiment, but which differs from the first exemplary embodiment only by means of the type of fastening to the machine tool or to the stand and in this respect, is identical with regard to the placement of the capacitors on the boards or circuit boards, which is shown here, to the first exemplary embodiment.

It is particularly preferable for the second casing 9 to be provided with recesses 11, each of which accommodates a respective power semiconductor component, cf. FIG. 5. The figure clearly shows that the recesses 11 are ideally embodied so that they completely surround the power semiconductor component 10 that they contain on four sides. In this way, the power semiconductor element 10 sits, so to speak, in a sink and is thus shielded particularly well.

As is likewise clear from the figure, each of the power semiconductor components 10 has three connections 12 for the voltage supply. The connections 12 of each power semiconductor component 10 in this case protrude into a region of the second casing 9 that constitutes a recess 13, cf. FIG. 5. Where necessary, this optional recess 13 facilitates the wiring of the connections 12 of the respective semiconductor component 10.

In the exemplary embodiment under discussion, however, that is not all there is to the novel positioning of the power semiconductor components 10. Instead, a particularly preferred embodiment is implemented here, in which the capacitors 14a, 14b are grouped around the induction coil at its outer circumference. The capacitors 14a are preferably smoothing capacitors which are a direct component part of the power circuit and the capacitors 14b are preferably resonant circuit capacitors, which are likewise a direct component part of the power circuit. In this case, the capacitors 14a, 14b, if they are conceptually rotated around the center of the coil, form a cylindrical ring. This cylindrical ring encompasses the induction coil and preferably also the power semiconductor components that are grouped around the latter's outer circumference. In order to electrically connect the capacitors 14a, 14b, a plurality of electrical circuit boards 15a, 15b are provided which each enclose the outer circumference of the induction coil. Each of these circuit boards 15a, b preferably forms a flat washer. Each of the circuit boards is preferably composed of FR4 or similar materials that are used for circuit boards. As is clear from the drawings, the axis of rotational symmetry of each of the two circuit boards that are embodied here as annular circuit boards, in this case coaxial to the longitudinal axis of the coil. Each of the circuit boards is optionally fastened to the inside of the trench in the magnetic covers 3a, 3b at the place where the magnetic covers 3a, 3b protrude beyond the second casing in the radial direction.

The upper of the two electrical circuit boards 15a supports the capacitors—for example the smoothing capacitors 14a or the resonant circuit capacitors 14b—whose terminal lugs extend through the circuit board or are connected to the circuit board using the SMD technique so that the smoothing capacitors hang down from the circuit board. The lower of the two circuit boards is embodied correspondingly; the capacitors—for example the resonant circuit capacitors 14b or the smoothing capacitors 14b—protrude upward from it. On the whole, the two electrical circuit boards 15a and 15b accommodate between themselves all of the capacitors 14a, 14b of the power circuit that feeds the induction coil, viewed in the direction along the longitudinal axis of the induction coil.

It can therefore be said that the power semiconductors form a first imaginary cylinder, which encompasses the induction coil and that the capacitors 14a, 14b form a second imaginary cylinder, which encompasses the first imaginary cylinder. Preferably, the capacitors that are only slightly sensitive to the leakage field form the imaginary outer cylinder, while the power semiconductor components, which are dependent upon an installation space that has as weak as possible a leakage field, form the imaginary inner cylinder.

The Particular Embodiment of the Control Circuit Board or Other Circuit Boards

It can be necessary for the circuit board that supports the control unit and/or the circuit boards that contact the capacitors, which are positioned directly in the power circuit, to be embodied as shielded.

For this purpose, preferably multi-layer circuit boards are used or the so-called multi-layer technique. In this case, two or more circuit boards are stacked on one another. The conductor paths extend predominantly or substantially on the inside of the circuit board packet that is produced in this way. At least one outer main surface of the circuit board packet is metallized essentially over its entire area and therefore serves as a shield.

The Special Supplying of the Induction Coil

It should first of all be stated as a general note that the coil shown in FIG. 1 is preferably not fully wound over its entirely length. Instead, it is preferably composed of two as a rule essentially cylindrical winding packets. Each of these forms an end surface of the induction coil. Preferably, the one of the two coils (in this case the lower one) is movable in the direction parallel to the longitudinal axis L and therefore can be adjusted during operation so that the only region of the respective sleeve part that is ever heated is the one that needs to be heated. This prevents an unnecessary heating and also prevents the generation of an unnecessarily powerful field, which naturally has an effect on the leakage field that is encountered. Such a coil also contributes to the reduction in the reactive power since it lacks the windings in the middle region, which are not absolutely required from the standpoint of the most effective possible heating of the sleeve part of the tool holder, but which—when present— have a tendency to produce additional reactive power without making a truly significant contribution to the heating.

In order to supply the induction coil so that it produces the desired effect and the sleeve part of a tool holder heats up quickly enough, it is generally not sufficient to simply connect the induction coil directly to the 50 Hz alternating current from the electrical grid.

Instead, the frequency of the voltage, voltage that is fed to the coil, must be increased. This is generally carried out electronically using a frequency converter. But if one simply powers the coil with a frequency converter without taking other special steps, as has occurred frequently in practice before now, then high reactive power losses occur.

From the standpoint of energy efficiency, these reactive power losses are no longer relevant since the on-times in a shrink-fit device are small—even after a few seconds of on-time, the induction coil has heated the sleeve part of a tool holder enough that the tool shaft can be shrink-mounted or removed, which is why the reactive power losses have not been perceived as undesirable before now.

The inventors have now realized that although avoiding reactive power losses is important since they lead to the heating of, among other things, the induction coil itself. In order to be able to avoid the reactive power losses, according to the invention, the induction coil must be supplied via a resonant circuit. In the resonant circuit according to the invention, most of the energy required fluctuates periodically (at a high-frequency) back and forth between the induction coil and a capacitor unit. As a result, in each period—i.e. periodically—the only energy that must be replenished is that which is lost to the resonant circuit by means of its heating capacity and its other dissipation loss. The previous very high reactive power losses are therefore eliminated. This results in the fact that the components of the power electronics can for the first time be miniaturized so much that—usually with an additional solution to the special shielding problem that this assembly has—they can be integrated into the coil housing. As a result, a portable induction shrink-fit device is already within reach because its overall weight of less than 10 kg can be carried by the user to the machine tool in order to use it on site.

Figure 7:
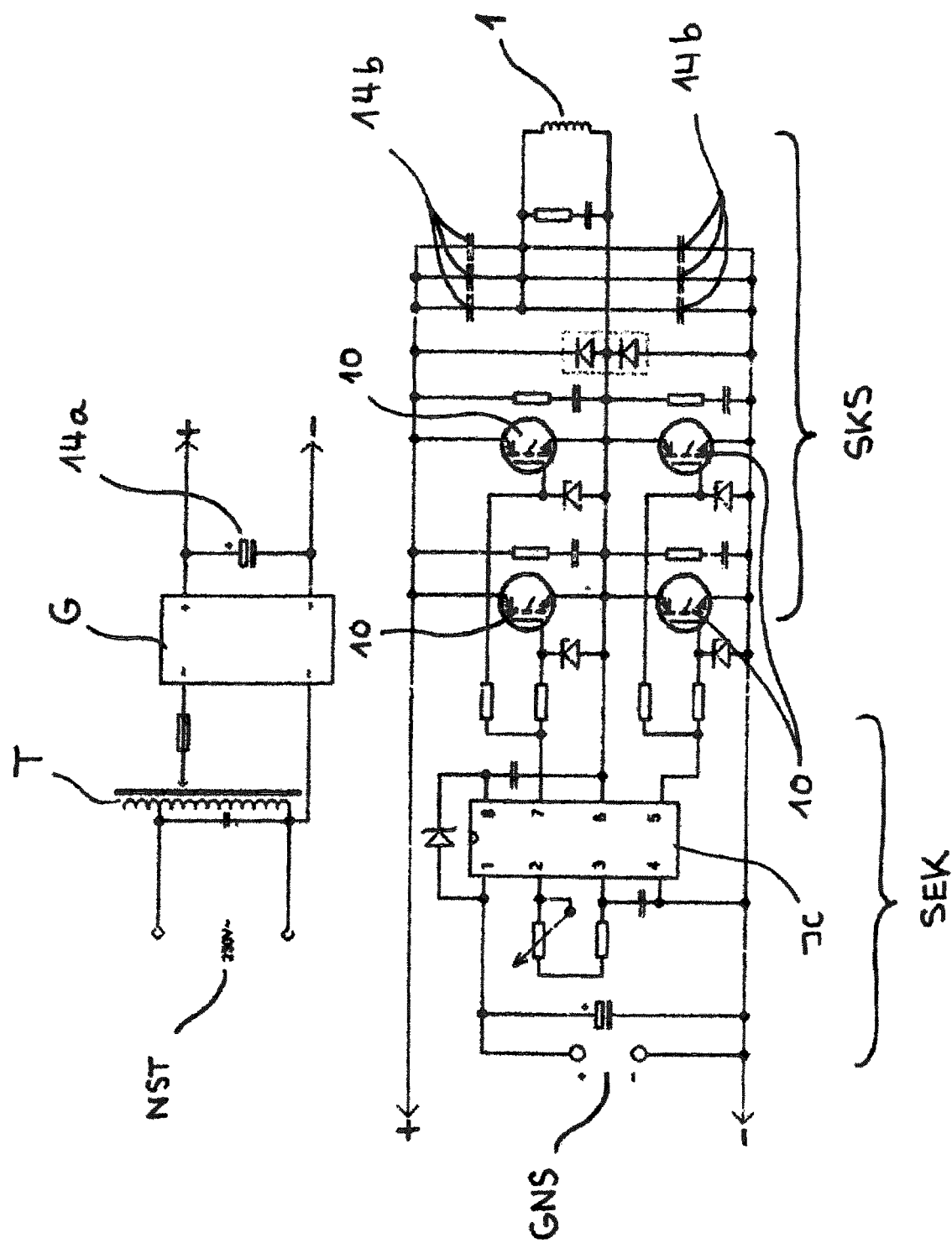
FIG. 7 shows the wiring diagram of a circuit for powering the induction coil, which according to the invention, can be used for the exemplary embodiments.

The power electronics feeding the induction coil are preferably embodied as shown in FIG. 7 and are then characterized by the following features On the input side, the power electronics is preferably fed with the universally available grid current NST, which in Europe is 230 V/50 Hz/16 $A_{max}$ (corresponding values in other countries e.g. 110 V in the USA). This is possible for the first time because the previous reactive powers are avoided, whereas before, a 380 V "three-phase current" connection. This does not rule out the possibility that under special circumstances a 3-phase rotary current connection will be needed, e.g. when higher power is needed. Naturally, it is possible to operate on three-phase current even when power needs are low.

The grid current is then preferably stepped up to a higher voltage (transformer T) in order to reduce the currents that flow at a predetermined power. The current drawn from the grid is converted by the rectifier G into DC current, which in turn is smoothed by the smoothing capacitor(s) 14a.

The actual resonant circuit SKS is fed with this DC current. The backbone of the resonant circuit is formed by the power semiconductor components 10, the resonant circuit capacitors 14b, and the induction coil 1 for the shrink-mounting and removal. The resonant circuit is controlled and regulated by control electronics SEK, which are essentially embodied in the form of an IC and which are fed via their own input GNS with low-voltage DC current, which is tapped, if necessary, downstream of the rectifier G and the smoothing capacitor(s) 14a via a corresponding voltage divider resistor.

The power semiconductor components 10 are preferably implemented by means of transistors of the "Insulated-Gate Bipolar Transistor" type, or IGBTs for short.

The control electronics SEK preferably switch the IGBTs with a frequency that dictates the working frequency that occurs in the resonant circuit SKS.

It is important that the resonant circuit SKS never operates precisely in resonance, which lies at a phase shift between voltage U and current I of cos φ=1. In the present case, this would lead to the rapid destruction of the power semiconductor components 10 by the voltage peaks. Instead, the control electronics SEK are embodied wo that they operate the power electronics and their resonant circuit SKS in a working range that only lies close to resonance or the natural frequency of the inductive heating. Preferably, the resonant circuit is controlled and regulated so that 0.9<cos φ–S 0.99. The values that lie in the range of 0.95–S cos φ–S 0.98 are particularly advantageous. This once again leads to an avoidance of voltage peaks and therefore further fosters miniaturization.

It should be mentioned in passing that the minimized energy consumption makes it possible for the first time to operate on battery power. In the simplest case, a vehicle starter battery can be used as a suitable high-amperage battery.

The Particular Temperature Measurement

It is desirable provide shrink-fit devices of the species-defining type with an optimum of operational reliability. At least, this requires an automatic control of the heating time and/or heating capacity.

The so-called inductance u=di/dt is a characteristic value for coils through which AC current flows. In shrink-fit devices of the species-defining type, the tool holder, which has been with its sleeve part slid into the chamber enclosed by the induction coil, constitutes an essential component of the magnetic circuit. Stated more precisely, the sleeve part constitutes the metal core of the coil. The magnitude of the inductance to be measured therefore depends decisively on the degree to which the sleeve part fills the center or the so-called core, of the induction coil, i.e. whether the relevant sleeve part has a smaller or larger diameter or more or less mass and thus forms a smaller or larger core of the coil.

The inventor has now for the first time realized that the measurable inductance of an induction coil that is used for shrink-fitting depends not only on the geometry of the sleeve part, but also—in a practically applicable way, also depends on the temperature of the sleeve part of the tool holder. The hotter the sleeve part is, the greater the inductance of the inductive heating composed of the sleeve part and induction coil.

This is utilized according to the invention in order to improve the safety of the shrink-fit device. The method and the use and the correspondingly designed shrink-fit device make use of the following:

The number of different tool holders that can possibly be used in the shrink-fit device is finite. For this reason, it is not difficult for the manufacturer to measure and parameterize all—or at least the most important—of the tool holders that are used in the shrink-fit device. Apart from this, the user can easily be told how to measure sleeve parts of tool holders that have not yet been measured and additionally stored at the factory. The device according to the invention optionally has corresponding means or input options. In the ideal case, it uses prior parameters and a database to identify the respective contours through a measurement and then establishes the inductance in the shrink-fit chuck used.

This measurement is carried out such that the sleeve parts of the corresponding tool holders are inserted into the interior of the induction coil and then a measurement is performed to determine the current inductances that the inductive heating—composed of the induction coil and the sleeve part inserted into it—has when the sleeve part has reached its maximum temperature. As a rule the maximum temperature is assumed to be the temperature at which the shrink-fit mounting and removal can be optimally carried out. This prevents the sleeve part from being heated with unnecessary intensity and having to cool again for an unnecessarily long time. Purely for reasons of patent law or, alternatively stated, the maximum temperature may even lie somewhat higher. The maximum temperature that constitutes the threshold is then the maximum permissible temperature before destruction occurs, as a so-called overheating protection.

The maximum values measured in this way are stored for each tool holder, generally in the shrink-fit device or in its control unit. They remain available there for comparison at any time.

In order to shrink-fit a particular tool holder, the sleeve part is inserted into the induction coil and in this connection, a query is performed as to which tool holder should now be subjected to a shrink-fitting or removal. After the user has input this information or it is has been automatically detected, then for this tool holder, the inductive heating reads out what inductance the sleeve part/induction coil inductive heating has when the sleeve part has reached the desired temperature. Then the inductive heating process is started. In this case, the present inductance is respectively measured. As soon as the currently measured present inductance approaches the threshold (i.e. the stored inductance) or this threshold is exceeded, the supply of current to the induction coil is influenced—generally switched off or at least reduced to a point that no damage can occur.

Preferably, care is taken to insure that the inductive heating of a tool holder, or more precisely its sleeve part, can only be started when it has been verified that a tool holder with a cold sleeve part has in fact been inserted into the induction coil.

In order to achieve this, a further measurement is carried out at the factory.

This measurement is embodied such that the sleeve parts of the corresponding tool holders are brought into the interior of the induction coil and then a respective measurement is performed as to what inductance the inductive heating composed of the induction coil and the sleeve part inserted into it has when the sleeve part is cold, i.e. has been warmed to below 35°. The cold values that are measured in this way are stored for each tool holder, generally in the shrink-fit device or in its control unit. They remain available there for a comparison that is to be carried out at the start of a shrinking process.

Once the user has input—or it has been automatically detected—which tool holder with which sleeve part has been inserted into the induction coil, then the induction coil is at least briefly supplied with current and the present inductance is measured at the same time. If it turns out that the present inductance lies above the stored cold value, then this is a sign that an already hot sleeve part of a tool holder is contained inside the induction coil. Then an error message is issued and/or preferably, the heating process is not started or is aborted.

Figure 8:
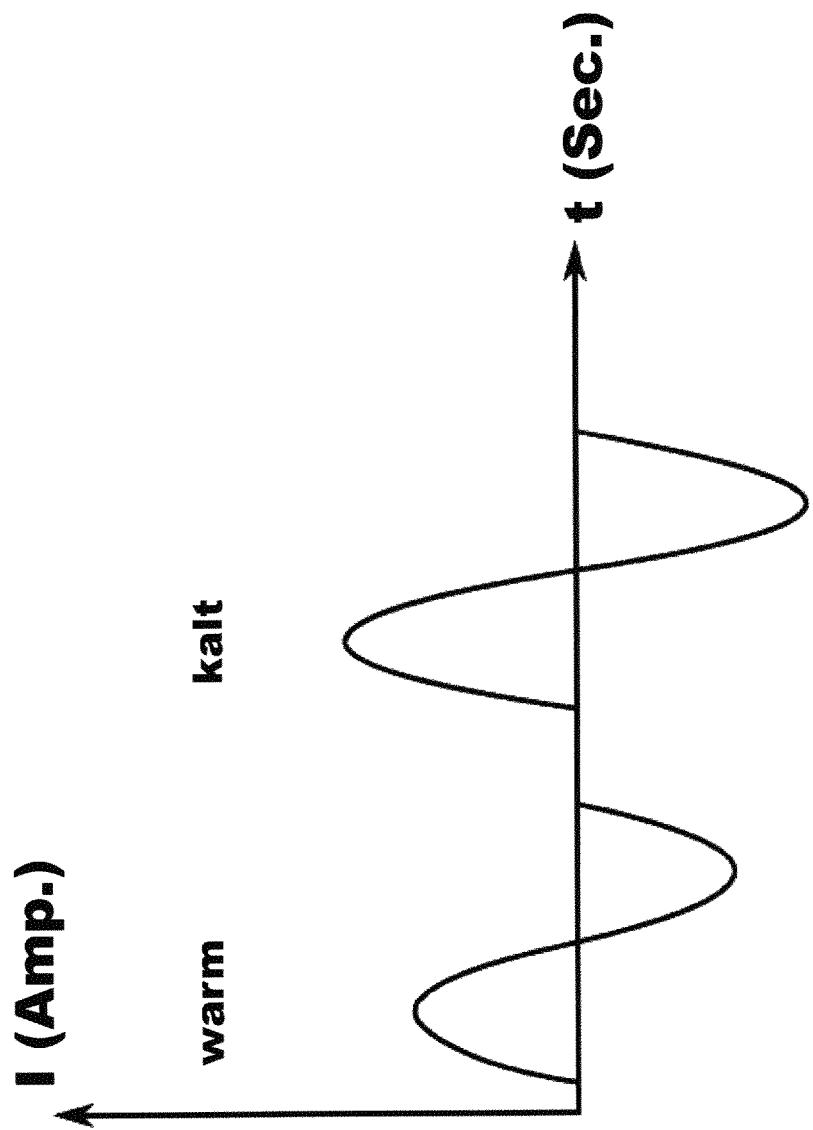
FIG. 8 shows the different edge steepness, which is a measure for the inductance.

Preferably, in order to determine the inductance, the edge steepness of the time/current curve is measured and evaluated and used to determine the inductance. In this regard, reference is made to FIG. 8. The left half of FIG. 8 shows the time/current curve that the system composed of the induction coil and sleeve part exhibits when fed by a frequency converter with a cold sleeve part. The right half of FIG. 8 shows the time/current curve that the system exhibits with the same amount of power supplied, but with a sleeve part that has been heated to shrink-fitting temperature.

A particularly useful option in connection with the temperature monitoring according to the invention is the automatic identification of the geometry of the sleeve part that has been respectively inserted into the induction coil.

In this connection, not just the inductance, but also amount of power consumption by the induction coil in the course of a particular unit of time. The decisive measure, therefore, is not the edge steepness of the individual waves, but rather the time/current curve as a whole for a particular time interval.

In order to determine this, a precisely operating power source is used to output a current (test pulse) with a known current magnitude, current shape, frequency, and duration of the impingement on the coil. Current magnitude is understood here to mean the maximum amplitude of the current. Current shape is understood here to mean the type of AC voltage, for example a square-wave voltage. Duration of impingement is understood here to mean the time during which the test pulse is output.

Depending on the diameter and mass of the relevant sleeve, it yields a different curve of the power consumption within the relevant unit of time, i.e. a different time/current curve. This means that each sleeve part has a magnetic fingerprint, so to speak.

Based on this, it is once again possible to proceed in such a way that for all of the sleeve parts to be taken into account for processing on the shrink-fit device, the power consumption within a particular unit of time, i.e. the time/current curve, is measured at the factory and stored in the shrink-fit device. If the customer has then introduced a particular sleeve part of a particular tool holder in the induction coil, a corresponding test pulse is output to the coil, before the start of the actual inductive heating procedure. The resulting total time/current curve is compared to the stored values in order to thus determine which sleeve part has been inserted into the induction coil.

This saves the user from having to indicate at the beginning of the inductive heating, which type of tool holder with which sleeve part he would currently like to process with the shrink-fit device. This is instead detected automatically. Consequently, the shrink-fit device according to the invention can automatically retrieve the stored inductance value, which is a measure for whether the inductive heating procedure must be terminated. At the same time, it is possible that the shrink-fit device according to the invention also automatically retrieves the cold value of the present inductance belonging to the relevant sleeve part and before the start of the inductive heating, determines whether the sleeve part that has been inserted into the induction coil is even actually cold.

Figure 9:
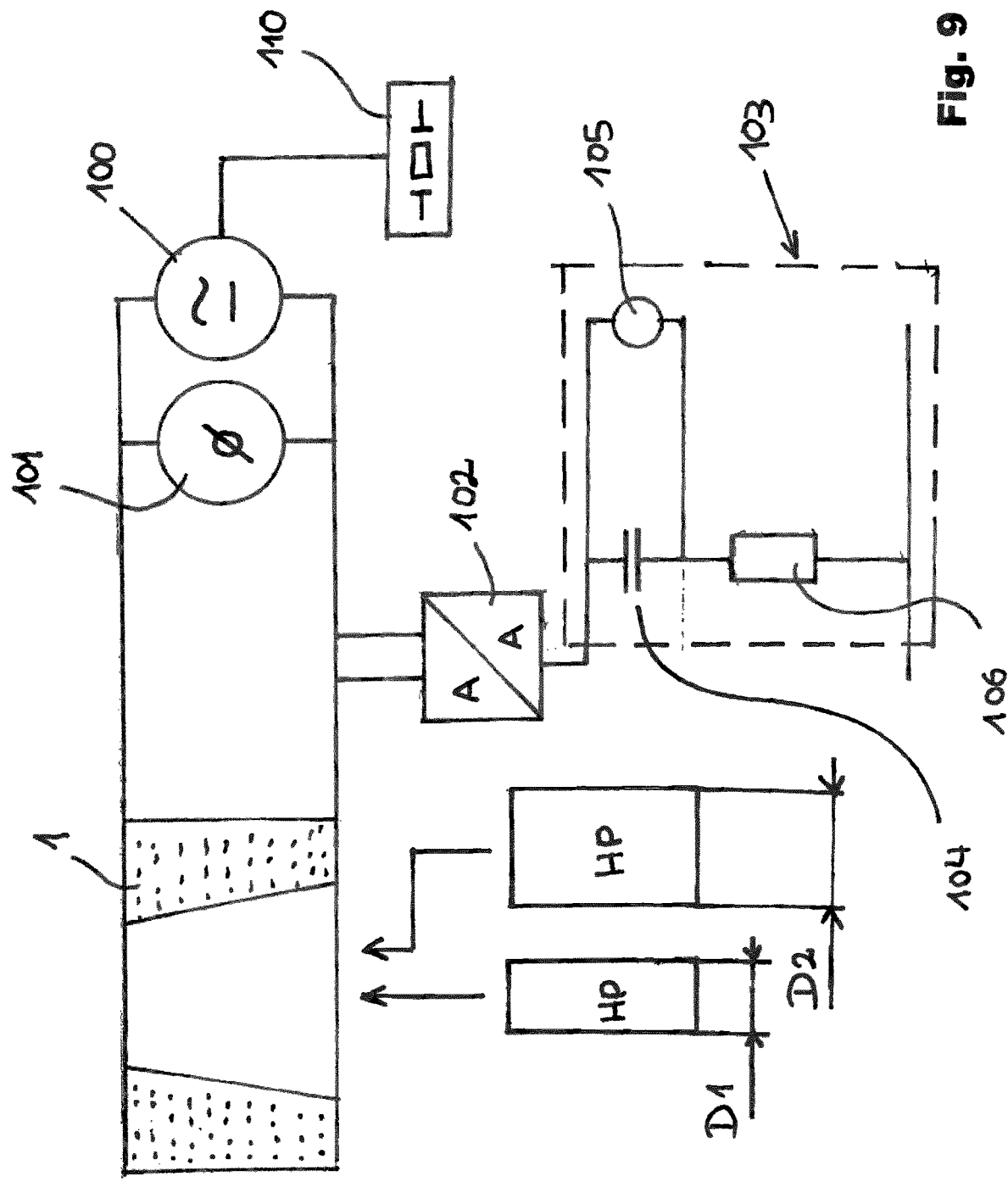
FIG. 9 shows a circuit arrangement of the kind that can be used according to the invention in order to measure the inductance and possibly also to automatically determine the geometry of the sleeve part.

FIG. 9 shows how the measurements described in this section can be implemented in terms of instrumentation. The induction coil 1 is readily apparent here. The induction coil 1 is fed by a power source 100, which generates a precisely defined test pulse, as described above. In order to be able to produce such a test pulse with the required precision, a regulating unit 110 can be provided.

Between the two connection leads of the induction coil 1 there is a measuring device 101, which measures the present inductance and which can be a measuring device of an intrinsically known design. This measuring device 101 preferably includes a comparator, which compares the currently measured present inductance to an inductance threshold, which is a measure for whether the sleeve part has been heated enough to perform a shrink-mounting or removal. Preferably, the comparator is also able to compare whether the currently measured cold value of the present inductance corresponds to the cold value of the inductance that the sleeve part that is currently inserted in the induction coil should have.

An auxiliary circuit 103 is connected by means of a converter 102. This auxiliary circuit serves to determine what geometry the sleeve part has, which is currently inserted in the induction coil. For this purpose, the auxiliary circuit has at least one precision capacitor 104 and at least one measuring device 105. The measuring device 105 is able to measure the present voltage that is present via the capacitor. The auxiliary circuit also generally has a discharging resistor 106, which is typically connected to ground and insures that the discharging resistor is discharged again after a test cycle, with the resistance being selected to be high enough that it does not disadvantageously influence the actual, relatively short testing cycle.

Depending on the embodiment of the sleeve part HP that is inserted into the interior of the induction coil 1 (also see the two variants in in FIG. 9), a change occurs to the time/current curve that is exhibited by the induction coil when it is acted on with the above-mentioned test pulse. This results in a corresponding change in the time/current curve that is measured at the capacitor 104 by means of the measuring device 105. This time/current curve is a respective fingerprint for the state of the sleeve part.

Mobile Unit

A particular feature of the invention is that it enables for the first time, a mobile shrink-fit unit, which is ready for operation, generally weighs less than 10 kg, for this reason and mostly due to its "only a coil housing with a plug" design, can be easily carried and maneuvered. For this reason, it is brought "to the machine tool" in order to be used on-site at the location of the machine tool. It is therefore possible to leave behind the previous concept of the stationary shrink-fit machine to which the tool holders have to be delivered and from which the tool holders have to be transported once more in order to perform a tool change and continue working.

It should first be generally noted that at least the components "induction coil, the first casing and, if provided, also the second casing, the power semiconductor components, and preferably also the capacitors" are accommodated in a shared housing. Ideally, in addition to the induction coil, all of the components that are required for the operation of the induction coil, including the control electronics, are accommodated in a shared housing.

Preferably, the only thing leading out from the housing is a feeder cable, which is used as a voltage supply to the shrink-fit device that is formed in this way and for this purpose, ideally has a plug connector at its end, which enables the tool-free connection to the voltage supply. Preferably grid voltage is used here for the voltage supply, as explained above. The end of the feeder cable is then preferable equipped with a Schuko plug connector, which corresponds to the respective national requirements.

If the shrink-fit device is to be held in the hand, then centering means are advantageously mounted on the coil housing, which facilitate the centering of the coil relative to the axis of the tool. The centering means can, for example, be embodied as radially movable fingers Fi, as shown in FIGS. 1 and 2.

It has turned out to be particularly advantageous if the device is provided with at least one coupling KU that permits it to be coupled to the machine tool.

As a result, the device can be easily fastened to the machine tool and then assumes a working position that is safe and protected from contamination by coolant and chip particles.

This coupling KU preferably corresponds to the current coupling profiles of the kind that are used for the tool holders that are to be processed with the shrink-fit device according to the invention, e.g. an HSK profile, as shown by FIG. 2. In order to bring the shrink-fit device according to the invention into a safe working position all that is needed is to uncouple the tool holder that is to undergo a tool change from the spindle of the machine tool and in its place, to couple the shrink-fit device with its identical coupling profile to the spindle of the machine tool. It is particularly advantageous if under normal operating conditions, the coupling of the shrink-fit device can be removed from the shrink-fit device, preferably by hand without tools (particularly by means of a bayonet coupling). The coupling of the shrink-fit device can thus easily be adapted to the coupling type being used on the respective machine tool—machine taper coupling, HSK etc.

Ideally, the respective couplings are connected to the shrink-fit device according to the invention in such a way that cooling fluid/cooling lubricant that is output by the cooling system of the machine tool can flow through the at least one cooling duct provided in the shrink-fit device, preferably in its second casing—as explained above.

In this case, a cooling device—preferably one that is integrated into the shrink-fit device (as close to the induction coil as possible)—can also be provided. The sleeve part of the tool holder is inserted into it after the end of the shrink-fitting procedure in order to actively cool it to a harmless contact temperature. This cooling device is advantageously also fed by the cooling system of the machine tool, generally also via the above-mentioned coupling. Based on this, protection is also claimed for the use of the cooling fluid that is output from a machine tool for cooling purposes (cooling of the second casing and/or the tool holder) inside a shrink-fit device.

Alternatively, the shrink-fit device can also be stored in the tool magazine of the machine tool. The tool changer can then either automatically insert the shrink-fit device into the machine spindle or convey it to a tool socket that is clamped in the spindle in order to remove or shrink-fit a tool. In the second case, the energy can be supplied via a cable, which is plugged directly into the shrink-fit device by means of a connector. In both cases, the shrink-fit device does not have to be held by hand.

General Remarks

Protection is also claimed for those shrink-fit devices or methods or uses, which respectively have only the features of one or more of the following paragraphs, regardless of features that are claimed by the currently cited set of claims. Furthermore, protection is also claimed for those shrink-fit devices or methods or uses, which have the features of one or more of the paragraphs listed below and in addition, also have other features from the claims that have already been proposed or the rest of the description including the figures.

A shrink-fit device, which features the fact that the circuit board is an annular circuit board whose axis of rotational symmetry extends preferably coaxially, otherwise parallel to the longitudinal axis of the induction coil.

A shrink-fit device, which features the fact that two annular circuit boards are provided, between which the smoothing capacitors are arranged along the circumference of the induction coil.

A shrink-fit device, which features the fact that the second casing forms one or more cooling ducts, which preferably extend in its interior.

A shrink-fit device, which features the fact that the device has a coupling for fastening the device in the recess of a machine tool spindle.

A shrink-fit device, which features the fact that the shrink-fit device is embodied so that it can be fed with coolant by the cooling system of the machine tool.

A shrink-fit device, which features the fact that the induction coil—with its first and second casing and at least the power semiconductor components and/or the smoothing capacitors and ideally also the electronics for controlling the power semiconductor components are accommodated on the inside of a coil housing or coil housing ring, which encompasses at least the circumference of the induction coil and preferably also overlaps at least one, or better still both, end surfaces of the induction coil.

A shrink-fit device, which features the fact that the coil housing has a plug for a direct feed of AC voltage from the public electrical system (110 V, 230 V, or 380 V).

A shrink-fit device, which features the fact that the shrink-fit device is battery-operated.

A shrink-fit device, which features the fact that a shielding collar is provided, which is composed of individual segments that can be moved in such a way that they can move with one movement component in the radial direction and one movement component in the axial direction.

A shrink-fit device, which features the fact that on the end surface of the induction coil oriented toward the tool holder and/or in the air-filled interior of the induction coil, centering means are provided, which force a sleeve part to assume a coaxial positioning in the induction coil, at any rate when the sleeve part has been inserted until it has reached a stop in the induction coil.

A shrink-fit device, which features the fact that the shrink-fit device has at least two coil winding sections, which can be moved toward or away from each other in the direction parallel to the longitudinal axis during operation in order to adjust to the geometry of a sleeve part that is to be heated.

A shrink-fit system that consists of a shrink-fit device according to one of the preceding paragraphs, which features the fact that the shrink-fit system also has numerous additional couplings that can be fastened to the shrink-fit device, by means of which the shrink-fit device can be affixed to the spindle of a machine tool.

REFERENCE NUMERAL LIST 1 induction coil
2 windings (electrical winding) of the induction coil
3 first casing
3a end-surface magnetic cover, preferably in the form of a pole shoe
3aa annular pole piece
3bb shielding collar
3b end-surface magnetic cover
4 tool holder
5 shield 5
6 not assigned
7 passage of the pole shoe 7
8 not assigned
9 second casing
10 power semiconductor component 1
11 recess 11
12 connection 12 of a power semiconductor component
13 recess of the second casing
14a smoothing capacitor
14b resonant circuit capacitor
15a electrical circuit board
15b electrical circuit board
16 cooling duct 16
17 cooling duct feeder line
18-99 not assigned
100 power source
101 measuring device (inductance sensor)
102 converter
103 auxiliary circuit
104 measurement capacitor
105 measuring device (volt meter)
106 discharging resistor
107 not assigned
108 not assigned
109 not assigned
110 regulating unit
G rectifier
GNS low-voltage DC current for supplying the control electronics
H holding shaft of the tool
HP sleeve part of the tool holder
IC integrated circuit as part of the control electronics
KU coupling for coupling the shrink-fit device to a machine tool
L longitudinal axis of the induction coil and of the tool holder
NST grid current
SEK control electronics
SKS resonant circuit
T transformer
W tool
Fi radially movable finger for centering the sleeve part or tool holder in the induction coil

The invention claimed is:

1. A method for monitoring the temperature of a sleeve part of a tool holder, which is inserted into an induction coil of a shrink-fit device,
wherein present inductance of the induction coil is measured during inductive heating and current supply to the induction coil is influenced if the present inductance approaches, reaches, or exceeds a predetermined value; and
for establishing reference data for one or more tool holders with different sleeve parts, comprises:
during a shrink-fitting procedure, heating the sleeve part of the tool holder by inductive heating with the induction coil and measuring the present inductance of the induction coil when the sleeve part, inserted into the induction coil, is heated enough for a shrink-mounting or removal, and
storing said present inductance of the induction coil for the tool holder with the sleeve part used in the shrink-fitting procedure when the sleeve part is ready for shrink-mounting or removal; and
for subsequent shrink-fitting procedures for one or more tool holders with different sleeve parts, comprises:
at the beginning of a new shrink-fitting procedure, performing a query to determine which tool holder with which sleeve part is inserted into the induction coil for the shrink-mounting or removal, heating the sleeve part of the tool holder by inductive heating with the induction coil and measuring the present inductance of the induction coil during heating, and terminating heating when the present inductance measured equals the stored inductance for the sleeve part of the tool holder when the sleeve part is ready for shrink-mounting or removal.

2. The method of claim 1, wherein edge steepness of an alternating current flowing through the induction coil is ascertained in order to determine the present inductance of the induction coil.

3. The method of claim 1, for one or more tool holders with different sleeve parts wherein, a measurement is taken of the present inductance of the induction coil when the sleeve part, inserted into the induction coil, has not yet been heated and at the beginning of a new shrink-fitting procedure, and the result thereof is stored;

a query is performed as to which tool holder has been inserted into the induction coil for shrink-mounting or removal and an error message is issued, or heating is aborted or at least shortened, if when measured the initial inductance is greater than a maximum threshold that the inductance is permitted to have in a cold state of the relevant tool holder and its sleeve part.

4. The method of claim 1 for at least two tool holders with different sleeve parts wherein, a measurement is performed as to what chronological sequence of current flow occurs in the induction coil when the sleeve part has been inserted into the induction coil if the induction coil is acted on with a test pulse of a known current magnitude, known current shape, known frequency, and known on-time, and the result thereof is stored, and the measured values are compared to the corresponding chronological sequence of the current flow for the sleeve part of an unknown tool holder to determine the geometry of the sleeve part of the tool holder.

5. The shrink-fit device for carrying out the method of claim 1, wherein the shrink-fit device comprises:

a measuring device for determining the present inductance of the induction coil, a memory for storing inductances that the induction coil exhibits when sleeve parts of known tool holders are slid into the induction coil, and a comparator for comparing a present inductance value of the induction coil, which is determined for the sleeve part that is currently being treated, to an inductance value that is stored in the memory.

6. The shrink-fit device of claim 5 for shrink-mounting and removal of tools having a tool shaft using a tool socket, the device comprising:

the sleeve part which is open at a free end thereof and is composed of an electrically conductive material for accommodating the tool shaft in a frictionally engaging fashion, the induction coil which is embodied in the form of an annular or cylindrical coil, encompasses the sleeve part of the tool socket, and can be acted on with an alternating current to heat the sleeve part, power semiconductor components for producing the alternating current that powers the induction coil, and an induction coil housing composed of an insulating material, wherein the induction coil has a first casing composed of magnetically conductive and electrically nonconductive material on its outer circumference, wherein the induction coil and its first casing are enclosed on the outer circumference by a second casing, the second casing composed of magnetically nonconductive and electrically conductive material and designed so that it attracts and eliminates a leakage field occurring in its vicinity, and wherein at least the power semiconductor components are accommodated together with the induction coil in the induction coil housing, and the induction coil housing encloses the induction coil, the first and second casing of the induction coil, and the power semiconductor components at least along the circumference of the induction coil.

7. The shrink-fit device of claim 6, wherein the power semiconductor components are accommodated directly on the outer circumference of the second casing.

8. The shrink-fit device of claim 6, wherein the second casing forms a cooling body for the power semiconductor components.

9. The shrink-fit device of claim 6, wherein the second casing has a plurality of recesses that can each accommodate a respective power semiconductor component, so that the semiconductor component is enclosed on four sides by the second casing.

10. The shrink-fit device of claim 6, wherein the shrink-fit device further comprises:

a rectifier and smoothing capacitors for producing a high-frequency alternating current inside the device for powering the power semiconductor components; and the smoothing capacitors may be grouped in a cylindrical annular shape around the induction coil at the outer circumference thereof.

11. The shrink-fit device of claim 6, wherein the shrink-fit device further comprises:

a rectifier and resonant circuit capacitors for producing a high-frequency alternating current inside the device for powering the power semiconductor components; and the resonant circuit capacitors may be grouped in a cylindrical annular shape around the induction coil at the outer circumference thereof.

12. The shrink-fit device of claim 5, wherein:

the induction coil and a first casing thereof are enclosed at the outer circumference by a second casing, the first casing is composed of magnetically conductive and electrically nonconductive material, and the second casing is composed of magnetically nonconductive and electrically conductive material and is designed so that it attracts and eliminates a leakage field occurring in its vicinity.

13. The shrink-fit device of claim 5, wherein the induction coil and power semiconductor components for producing an alternating current, which is modified relative to grid current and powers the induction coil, are accommodated together in an induction coil housing.

14. The shrink-fit device of claim 5, wherein an end surface of the induction coil oriented away from the tool socket is provided with a cover made of a magnetically conductive and electrically nonconductive material, the cover in the form of a pole shoe that covers the entire end surface.

15. The shrink-fit device of claim 14, wherein the cover has a localized shielding collar that protrudes in the direction of the longitudinal axis by at least twice the amount of the tool diameter across the free end surface of the sleeve part of the tool holder.

16. The shrink-fit device of claim 15, wherein the shielding collar can be replaced without tools.

17. The shrink-fit device of claim 5, wherein an end surface of the induction coil oriented toward the tool socket is overlapped by a magnetically conductive and electrically nonconductive material.

18. The shrink-fit device of claim 6, wherein the shrink-fit device has at least one electrical circuit board which encompasses the outer circumference of the induction coil and electrically contacts smoothing capacitors or the power semiconductor components.

19. The shrink-fit device of claim 13, wherein the shrink-fit device has at least one electrical circuit board which encompasses the outer circumference of the induction coil and electrically contacts the smoothing capacitors or the power semiconductor components.

* * * * *